(12) United States Patent  
Hitchcock et al.

(10) Patent No.: US 11,345,248 B1  
(45) Date of Patent: May 31, 2022

(54) WATER CHECK VALVE ADAPTER

(71) Applicant: TE Connectivity Services GmbH, Schaffhausen (CH)

(72) Inventors: Matthew Bryan Hitchcock, Middletown, PA (US); Aaron James de Chazal, Middletown, PA (US)

(73) Assignee: TE Connectivity Services GmbH

( * ) Notice: Subject to any disclaimer, the term of this patent is extended or adjusted under 35 U.S.C. 154(b) by 0 days.

(21) Appl. No.: 17/152,398

(22) Filed: Jan. 19, 2021

(51) Int. Cl.
*B60L 53/16* (2019.01)
*F16K 15/14* (2006.01)

(52) U.S. Cl.
CPC ............ *B60L 53/16* (2019.02); *F16K 15/148* (2013.01)

(58) Field of Classification Search
CPC .......... B60L 53/16; B60L 53/37; B60L 53/18; B60L 53/36; F16K 15/148; H02J 7/00; H01R 13/631
See application file for complete search history.

(56) References Cited

U.S. PATENT DOCUMENTS

| | | | | |
|---|---|---|---|---|
| 2,326,651 A * | 8/1943 | Husted | ................. | F16K 15/148 137/512.15 |
| 4,550,749 A * | 11/1985 | Krikorian | ............. | F16K 15/148 137/843 |
| 5,670,860 A * | 9/1997 | Conrady | ................. | B60L 53/18 320/109 |
| 5,909,099 A * | 6/1999 | Watanabe | ............... | B60L 53/34 320/108 |
| 8,174,235 B2 * | 5/2012 | Dyer | ....................... | B60L 53/00 320/109 |
| 8,350,526 B2 * | 1/2013 | Dyer | ....................... | B60L 50/66 320/109 |
| 9,102,238 B2 * | 8/2015 | Ohtomo | ................... | B60L 3/04 |
| 9,586,497 B2 * | 3/2017 | Epstein | ................... | B60L 58/26 |
| 9,786,961 B2 * | 10/2017 | Dyer | ....................... | B60L 58/26 |
| 10,557,561 B2 * | 2/2020 | Kleinke | ................. | F16K 31/126 |
| 2003/0075235 A1* | 4/2003 | Graham | .................. | B60L 58/30 141/82 |
| 2010/0187230 A1* | 7/2010 | Beer | ...................... | F16K 15/148 220/89.1 |
| 2010/0315040 A1* | 12/2010 | Sakurai | ................... | B60L 53/20 320/109 |
| 2015/0300511 A1* | 10/2015 | Fima | ................... | F16K 31/1268 137/512 |
| 2015/0314698 A1* | 11/2015 | Price | ....................... | B60L 58/26 307/9.1 |
| 2016/0319532 A1* | 11/2016 | Fima | ....................... | E03C 1/298 |
| 2017/0198469 A1* | 7/2017 | Wachter | ................ | A47K 11/12 |
| 2017/0250415 A1* | 8/2017 | Koiwa | ...................... | H02J 7/00 |

(Continued)

*Primary Examiner* — Craig M Schneider
*Assistant Examiner* — Frederick D Soski

(57) ABSTRACT

A charging inlet for an electric vehicle (EV) includes a body defining a socket housing a conductive charging terminal, and a flange extending from the body and defining an interior channel in fluid communication with the socket. A valve assembly of the inlet includes a cap or adapter body removably attachable to the flange. The cap defines an interior space in communication with the interior channel of the flange with the cap attached to the flange. The valve assembly further includes at least one sealing valve, such as an umbrella valve, attached to an exterior of the cap and adapted to permit the passage of fluid from the interior space of the cap to an external environment.

20 Claims, 3 Drawing Sheets

(56) References Cited

U.S. PATENT DOCUMENTS

| | | | |
|---|---|---|---|
| 2017/0299219 A1* | 10/2017 | Okabe | F24F 13/222 |
| 2019/0214161 A1* | 7/2019 | Chen | B60L 50/64 |
| 2019/0217728 A1* | 7/2019 | Reber | B60L 53/11 |
| 2020/0156492 A1* | 5/2020 | Mackenzie | B60L 53/305 |
| 2020/0189413 A1* | 6/2020 | Fagan | H01R 13/631 |
| 2021/0179194 A1* | 6/2021 | Song | B62D 25/24 |

\* cited by examiner

WATER CHECK VALVE ADAPTER

FIELD OF THE INVENTION

The present disclosure relates to charging receptacles or charging inlets for use with electric vehicles (EVs), and more specifically, to a charging inlet having an improved drainage valve assembly for the prevention of water retention.

BACKGROUND

Electric vehicles (EVs) are increasing in popularity as their practicality and usability improves. In order to fulfill consumer performance demands for both personal and commercial applications, these still-early systems must be continuously optimized to extract maximum performance, usability and convenience. One critical aspect of EV performance includes the ability to consistently charge the batteries of an EV as quickly as possible. In this way, it is desired to minimize any degradation in charging performance over the life of the vehicle.

Charging performance can be negatively affected by any number of factors, including water, dirt and other debris contaminating and/or degrading the electrical terminals or contacts of the charging inlet. Accordingly, it is desired to both shield these sensitive surfaces from the outside environment whenever possible, as well as provide provisions for draining water from the inlet, thus preventing damage from long term exposure to excessive moisture accumulated therein. Moisture exposure may be particularly problematic as the charging inlets may be exposed to precipitation over long periods of time during outdoor charging events. In other instances, the inlets may be partially or fully submerged in water, for example, during use in flood conditions or when used off-road. Current drainage solutions for EV charging inlets lack effective drainage characteristics, are expensive to manufacture, and moreover, allow for the ingress of dirt and other debris therethrough and into the inlet.

Accordingly, there is a need for improved systems and methods which provide adequate drainage while preventing ingress of debris into the inlet for maintaining ideal charging performance over the life of the vehicle and improving overall reliability.

SUMMARY

In one embodiment of the present disclosure a charging inlet for an EV is provided. The inlet includes a body defining a receptacle housing at least one conductive charging terminal, and a flange extending from the body. The flange defines an interior channel in fluid communication with the at least on conductive terminal. A valve assembly according to an embodiment of the present disclosure is removably attached to the flange and includes a cap or adapter body mateable thereto. The cap defines an interior space in communication with the interior channel of the flange when the cap is mated to the flange. The valve assembly further includes at least one sealing valve fixed to an exterior of the cap and adapted to permit the passage of fluid from the interior space of the cap to the external environment while preventing the ingress of foreign matter into the cap.

In another embodiment of the present disclosure, a detachable check valve adapter for use with an EV charging inlet is provided. The adapter includes a body having a first end for removably attaching to an opening formed on the charging inlet. A plurality of sealing diaphragms are mounted to the body. Each diaphragm has a sealing face abutting a valve seat defined in the body for sealing an interior space of the body from the external environment. The sealing face of each diaphragm is elastically deformable in a direction away from the valve seat under a pressure exerted thereon by a fluid present within the interior space of the body for permitting the passage of fluid through the adapter body and to the external environment.

BRIEF DESCRIPTION OF THE DRAWINGS

The invention will now be described by way of example with reference to the accompanying Figures, of which.

DETAILED DESCRIPTION OF THE EMBODIMENTS

Figure 1:
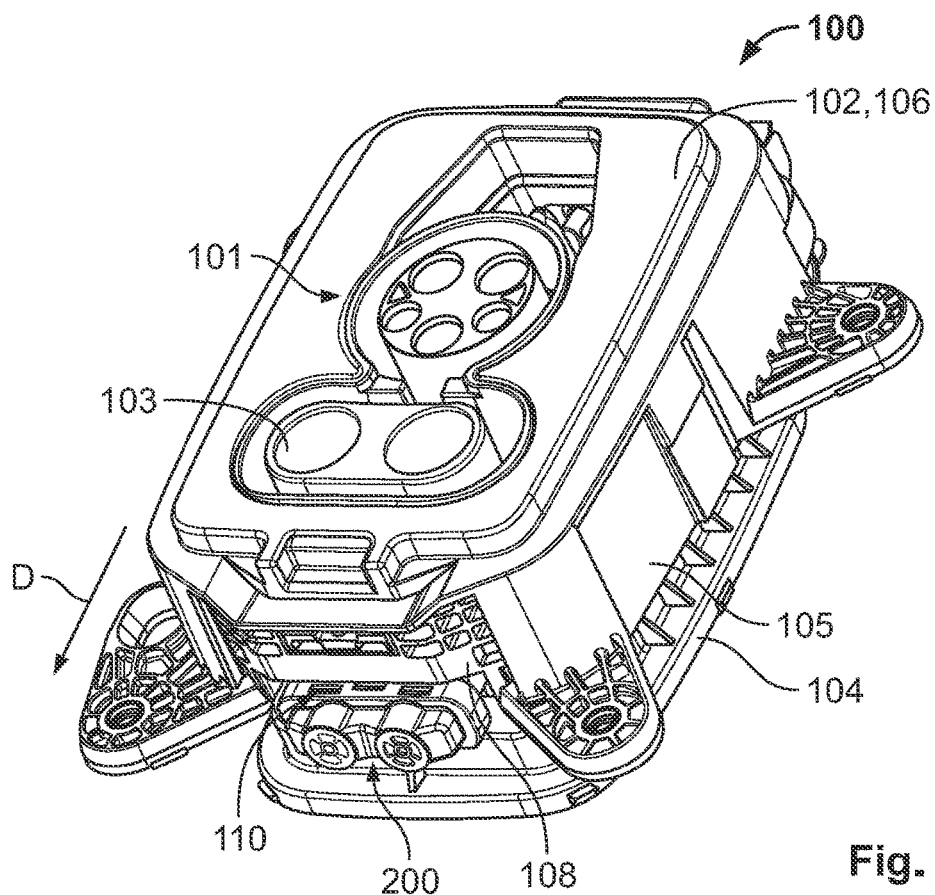
FIG. 1 is a perspective view of an EV charging inlet having a water drainage valve assembly fitted thereto according to an embodiment of the present disclosure.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure include improved drainage assemblies for use with EV charging inlets. An exemplary assembly comprises an adapter configured to be removably attached to a flange formed on a housing of the inlet, and more particularly, to an underside thereof in an installed position of the inlet. A facial seal is provided between the adapter and flange for ensuring a leak-proof seal therebetween, as well as for preventing the ingress of dust and other contaminants into the inlet via the housing-to-adapter joint. A body of the adapter includes at least one drainage opening defined on an end thereof, and a fluid-channeling portion tapering in a direction away from the housing and toward the drainage opening for funneling water received from the housing toward the opening. An umbrella valve or disc-shaped sealing diaphragm is attached to the adapter on an outer side of the drainage opening and defines a one-way fluid check valve. Specifically, the sealing diaphragm is configured to seal the drainage opening in the absence of sufficient fluid pressure exerted thereon from within the adapter. In this way, dirt and other debris is prevented from entering the adapter, and thus the charging inlet, via the drainage opening. However, in response to sufficient internal fluid pressure, or the presence of fluid (e.g., water water) within the adapter, the sealing diaphragm is configured to be biased away from the opening, permitting the fluid to exit the adapter under the force of gravity.

Figure 2:
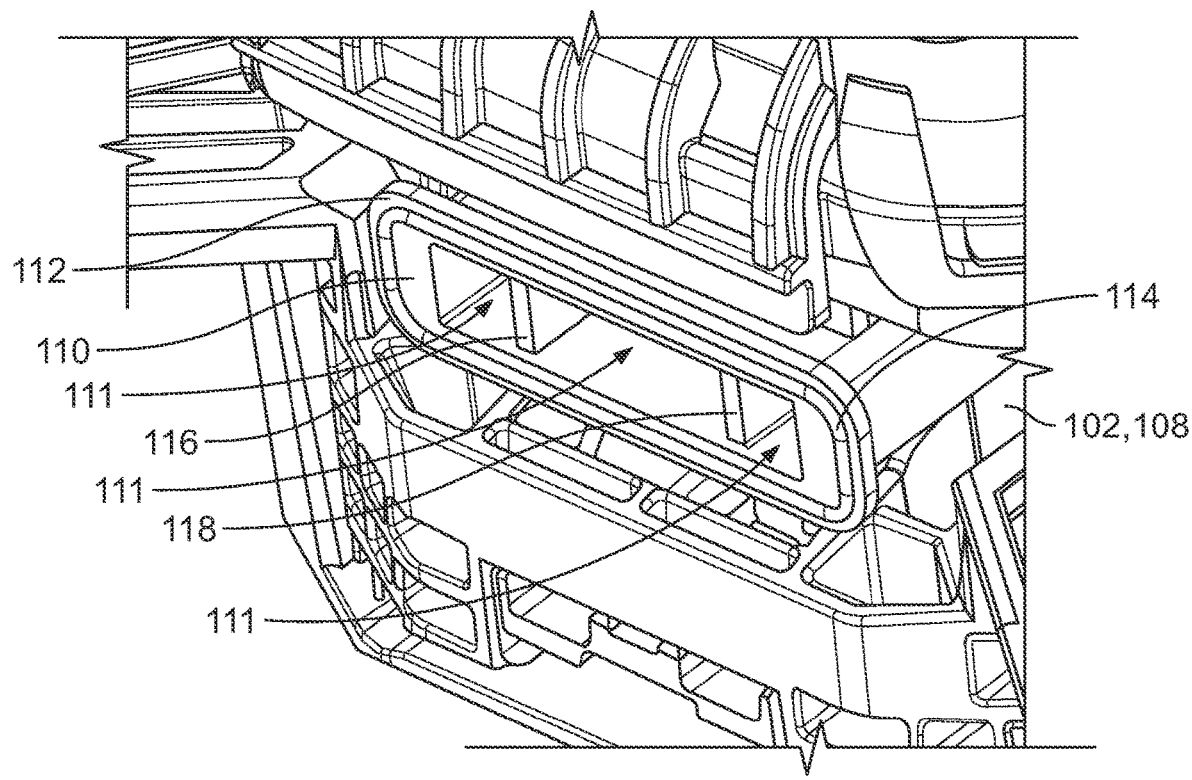
FIG. 2 is a perspective view of the EV charging inlet of FIG. 1, with the water drainage valve assembly removed to reveal a mounting flange.

Referring to FIGS. 1 and 2, an EV charging inlet 100 according to an embodiment of the present disclosure includes a housing 102 defining one or more charging sockets or receptacles 101, for example, a combination receptacle including an AC-type charging socket (shown) and a DC-type charging socket 103. The housing 102 includes a rear base 104, a circumferential wall 105 extending generally perpendicularly from the base, and a front wall or face 106. A bottom portion or bottom side of the housing or circumferential wall 105 is defined by a bottom wall 108 configured to be arranged in a generally downward facing manner with the inlet 100 mounted to or within a vehicle. More specifically, the charging inlet 100 is generally mounted in a vertical orientation, with the rear base 104 extending in a vertical direction and the charging socket 101 facing generally horizontally such that a corresponding charging plug may be inserted therein from a similarly horizontal direction by a user. Further, water or other fluid contained within the housing 102, or entering into the sockets 101, flows in a direction D (FIG. 1) generally toward the bottom wall 108 under the force of gravity. The housing 102 further includes a drainage flange 110 defined thereon and extending from the bottom wall 108 in the downward direction. A drainage valve assembly 200 according to an embodiment of the present disclosure is removably attached to the flange 110 and functions as a check-valve, permitting fluid (e.g., pressurized air or water) from exiting an interior of the housing 102, while preventing the ingress of dirt and other debris therein.

Referring specifically to FIG. 2, the flange 110 defines an open interior space or channel 111 extending from an open end thereof and into an interior of the housing 102 and/or an interior of the electrical socket or receptacle 101 defined in the housing for establishing fluid communication therebetween. The flange 110 defines a generally rounded rectangular profile, and includes a circumferential lip 112 extending about its periphery. An outward-facing side (or downward-facing side in an installed position) of the flange 110 defines a raised surface or ridge 114, which may be semi-circular in cross-section, surrounding the channel 111 in a continuous manner. First and second vertical partitioning walls 116,118 may be defined within the channel 111, separating it into the plurality of sub-channels or openings extending in a direction of fluid flow originating within the housing 102. For example, the lateral openings may be in fluid communication with a first type of socket of the inlet (e.g., the illustrated AC charging socket), while the center channel is in communication with a second type of socket of the inlet (e.g., the DC charging socket).

Figure 3:
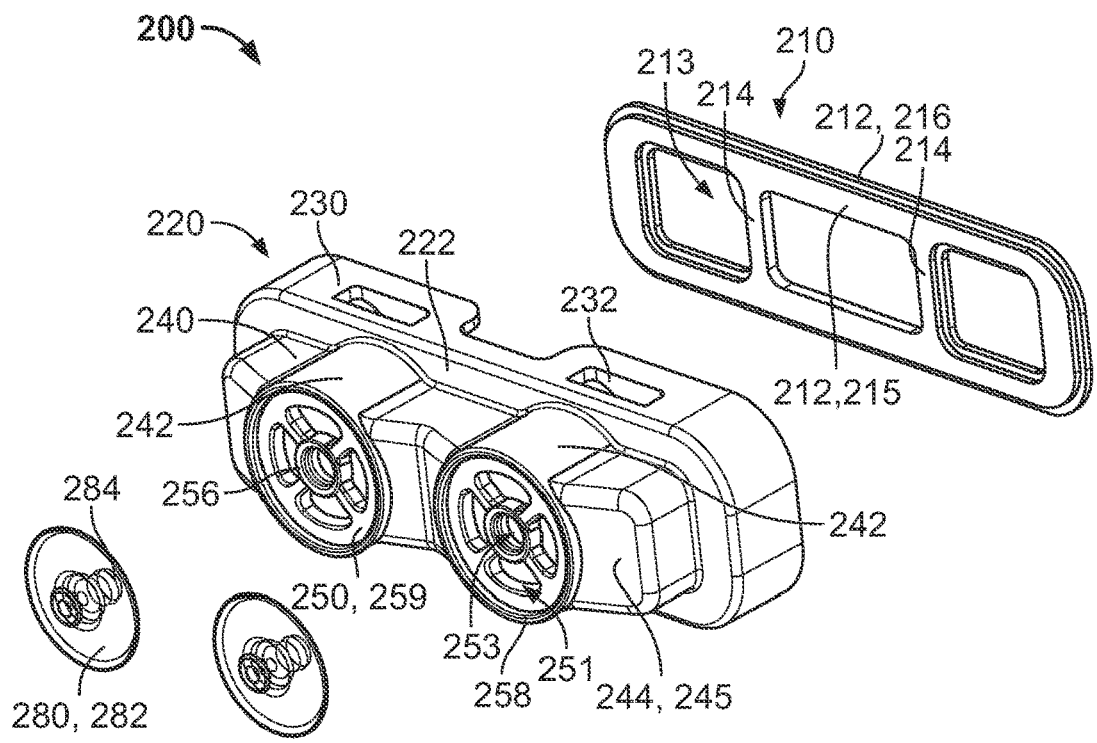
FIG. 3 is an exploded view of the water drainage valve assembly of FIG. 1.
Figure 4A:
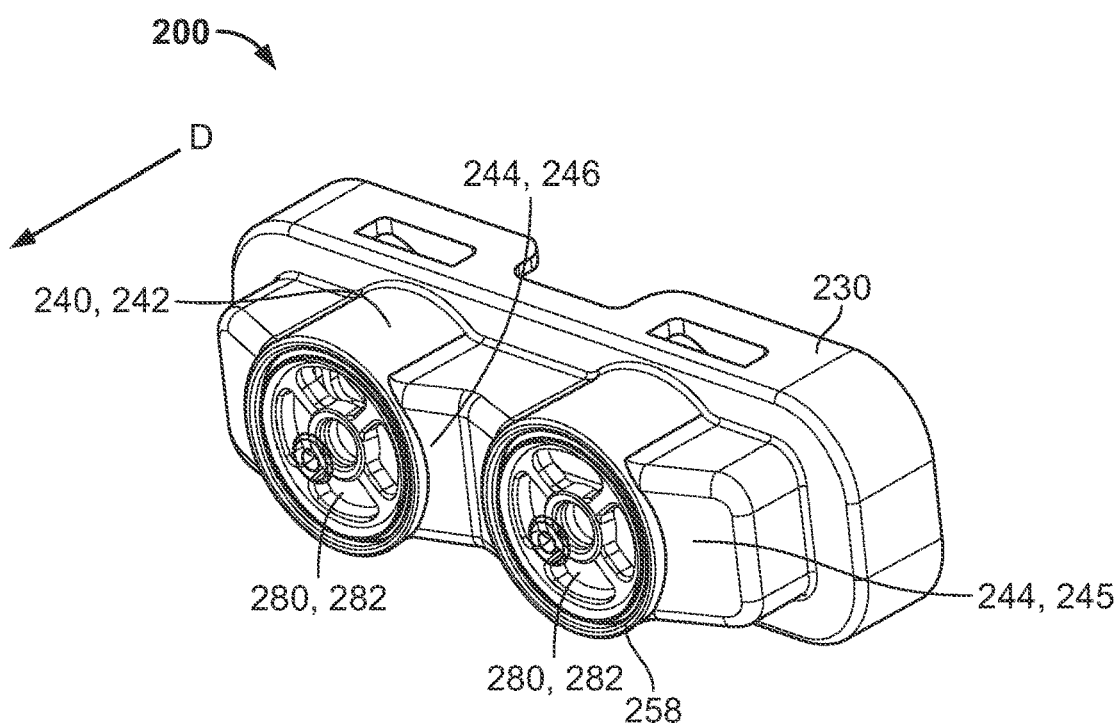
FIG. 4A is front perspective view of the water drainage valve assembly of FIG. 3 in an assembled state.
Figure 4B:
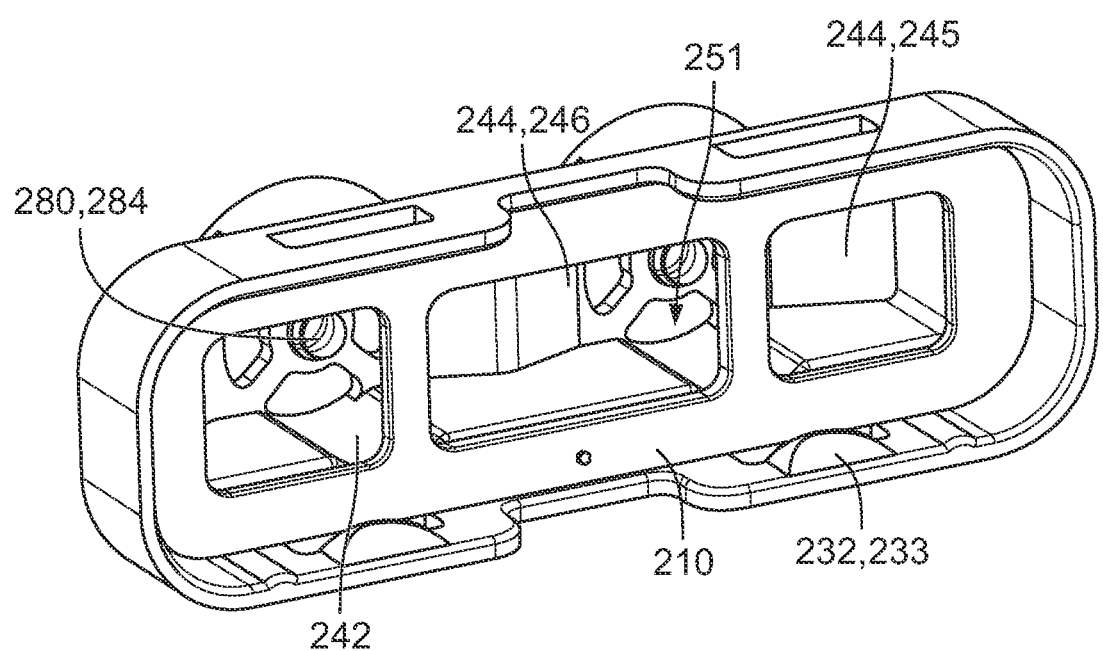
FIG. 4B is a rear perspective view of the water drainage valve assembly of FIG. 4A.

Referring generally to FIGS. 3, 4A and 4B, the drainage or water check valve assembly 200 includes a facial seal 210, such as a silicon seal, configured to be arranged between and seal an adapter cap 220 of the assembly to the flange 110. More particularly, the facial seal 210 comprises a rounded rectangular profile corresponding to that of the flange 110, including an outer circumferential wall 212 defining an opening 213. The facial seal 210 defines two vertical segments 214 extending across the opening 213 and corresponding in location to the vertical dividing or partitioning walls 116,118 of the channel 111 for adding rigidity to the seal. As shown, the circumferential wall 212 may comprise a stepped profile about its periphery, and includes an adapter-facing side 215 and an inlet-facing side 216, with the inlet-facing side having a larger circumferences or outer profile compared to the adapter-facing side 215.

The adapter cap 220 is defined by a body, for example, a molded polymer or plastic body, having a base 222, a first circumferential wall 230 defining a first or mounting end, a second circumferential wall 240 defining a water capturing or water funneling portion, and a plurality of drainage openings 251 defining a second or drainage end of the adapter cap. An interior of the first circumferential wall 230 corresponds in size to the outer dimensions of the circumferential lip 112 of the mounting flange 110 and extends from an outer edge of the base 222 in a first direction. The first circumferential wall 230 further comprises latching features, embodied as a plurality of protrusions 232 extending radially-inward from the circumferential wall proximate an open end thereof. The protrusions 232 are adapted to be elastically deflected in an outward direction as the adapted cap 220 is fitted over the flange 110, and to elastically engage with a back side of the circumferential lip 112 in a latching manner to secure the adapter cap to the flange. As shown in FIG. 4B, the protrusions 232 define inclined ramp surfaces 233 extending in a direction from the open end of the adapter cap 220, such that the mounting flange 110 engages the ramp surfaces when the adapter cap is installed thereon. Openings 234 in the first circumferential wall 230 are formed adjacent the latching protrusions 232 in a direction opposite the mounting flange 110 in an installed state. The openings 234 may aid in the removal or replacement of the adapter cap 220, providing access for releasing the latching connections to the flange 110. Moreover, the openings 234 may increase the elastic nature of the latching protrusions 232, permitting their selective elastic deformation during installation and removal of the adapter cap 220 from the flange 110. It should be understood that the facial seal 210 is elastically compressible. In this way, compressing the seal 210 as the adapter cap 220 is mated to the flange 110 will result in a return force placed on the adapter cap once latched in position on the flange. This return force will maintain tension on the adapter cap 220, urging the latching protrusions 232 into contact with the back side of the circumferential lip 112 and maintaining sealing pressure evenly about the seal 210 and the flange 110.

The second circumferential wall 240 defines a water capturing reservoir or section of the adapter cap 220. Specifically, the second circumferential wall 240 extends from the base 222 in a second direction, opposite the first direction of the first circumferential wall 230. The circumference of the second circumferential wall 240 is less than that of the first circumferential wall 230, such that the walls define a tapering or reducing internal profile. The second circumferential wall 240 further comprises semi-cylindrical sections 242. Drainage ends 250 are defined on radial end faces of the respective semi-cylindrical sections 242, with each face including the plurality of drainage channels 251 arranged symmetrically and radially about a center thereof.

The assembly 200 further includes one or more sealing valves or seals 280, such as umbrella valves or flexible sealing diaphragms, fitted to drainage ends or outlets 250 of the adapter cap 220. An opening 253 is formed through a center of each drainage end 250 and is adapted to receive a mounting stem or protrusion 284 of the seal 280. More specifically, each seal 280 comprises an elastomeric valve defined by a domed or disk-shaped "umbrella" sealing diaphragm or body 282, with the mounting stem 284 extending from a center thereof, and including, for example, a radially-expanded head on a free end thereof. The head is configured to be passed through and secured to the opening 253 in the center of the drainage end 250, as shown in FIG. 4A. A raised annular lip 256 is formed about each opening 253 for offsetting the mounting position of the seal 280 axially outward therefrom.

The drainage end 250 further defines a circumferential lip 258 extending from the radial face. The circumferential lip 258 defines a cylindrical recess for receiving the outer periphery of the seal 280. The depth of the recess defined by the lip 258 is selected so as to ensure at least the outer circumferential edge of the seal 280 is arrange within the recess, preventing damage thereto during use. As shown in FIG. 3, the drainage ends 250 each define a continuous annular sealing surface 259 oriented radially outward from the drainage openings 251. The seal 280 is configured to make continuous sealing contact with this annular or radial sealing surface 259 about its perimeter. In this way, the face of each drainage end 250, the annular sealing surface 259, and the circumferential lip 258 define a valve seat for receiving the sealing side of the seal 280.

As set forth above, the adapter cap 220 is configured to function as a funnel or a tapered drainage reservoir. Specifically, an end surface 244 of the second end of the adapter cap 220 comprise a plurality of first and second angled end walls 245,246. The first end walls 245 are angled generally toward a respective one of the drainage ends 250 from a respective lateral side of the second circumferential wall 240. Likewise, the second angled end walls 246 are arranged generally between each drainage end 250. As shown, each of the walls 245,246 taper toward a respective drainage opening 250. In this way, the first angled end walls 245 and the second angled end walls 246 are each partially opposing, defining a respective tapering channel for guiding water toward either of the two drainage ends 250. As shown in FIG. 4B, the corresponding interior walls of the semi-cylindrical sections 242 form semi-cylindrical channels aligned coaxially with a respective one of the drainage ends 250 and/or seals 280. In this way, the adapter cap 220 defines two adjacent, symmetrical channels for directing water from the housing 102 toward a respective one of two drainage openings and their corresponding seals 280.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A charging inlet for an electric vehicle (EV), comprising:
    a body housing an AC or DC electrical charging socket;
    a flange extending from the body and defining an interior channel in fluid communication with the electrical charging socket; and
    a drainage valve assembly, comprising:
        a cap selectively mateable to the flange and defining an interior space in communication with the interior channel of the flange with the cap mated to the flange; and
        at least one sealing valve attached to an exterior of the cap which permits the passage of fluid from the interior space of the cap to an external environment.

2. The charging inlet of claim 1, wherein the sealing valve comprises a flexible diaphragm.

3. The charging inlet of claim 2, wherein the flexible diaphragm comprises disc-shaped diaphragm having a center portion attached to the cap, and a radial portion selectively sealable to a surface of the cap and moveable between a sealing position and an open position in response to a force exerted by fluid in the interior space of the cap.

4. The charging inlet of claim 3, wherein the cap defines a recessed valve seat into which the radial portion of the valve is received.

5. The charging inlet of claim 4, wherein the valve seat comprises a radial face having a plurality of openings extending therethrough and in communication with the interior space of the cap.

6. The charging inlet of claim 5, wherein the plurality of openings include a central opening receiving the center portion of the sealing valve and at least one opening arranged radially with respect to the central opening for passing fluid therethrough.

7. The charging inlet of claim 1, wherein the cap further comprises a bottom wall formed on an end thereof and having a tapering profile for directing fluid toward the at least one sealing valve.

8. The charging inlet of claim 7, wherein the drainage valve assembly includes a pair of sealing valves and the cap defines a pair of valve seats defined on the bottom wall receiving the pair of sealing valves.

9. The charging inlet of claim 8, wherein the bottom wall of the cap comprises a pair of outer bottom wall segments each tapering in a direction toward one of the valve seats, and a pair of inner bottom wall segments arranged between the pair of valve seats and each tapering outward toward a respective one of the valve seats.

10. The charging inlet of claim 8, wherein the cap comprises:
    a base;
    a first circumferential wall extending from the base in a first direction and adapted to attach to the flange; and
    a second circumferential wall extending from the base in a second direction, opposite the first direction.

11. The charging inlet of claim 10, wherein the second circumferential wall defines a pair of semi-cylindrical interior openings aligned axially with the valve seats.

12. The charging inlet of claim 10, wherein the first circumferential wall defines a plurality of latches on an interior thereof and extending radially inward for engaging with a surface of the flange for selectively securing the cap to the body.

13. The charging inlet of claim 1, wherein the valve assembly further includes a facial seal arranged within an open end of the cap, the facial seal abutting an outer face of the flange with the cap mated thereto.

14. A check valve adapter, comprising:
    an adapter body having a first end removably attachable to an opening having a flange formed on an AC or DC electrical charging inlet; and
    at least one sealing diaphragm having a sealing face abutting a valve seat defined on the body sealing an interior space of the body from an external environment, the sealing face of the diaphragm elastically deformable in a direction away from the valve seat under a pressure exerted thereon by a fluid arranged within the interior space of the body for permitting the passage of the fluid through the body and to the external environment.

15. The check valve adapter of claim 14, wherein the valve seat comprises a radial face defining a plurality of openings extending therethrough and in communication with the interior space of the adapter body.

16. The check valve adapter of claim 15, wherein the adapter body comprises a circumferential wall arranged about the valve seat and defining a recess into which a radial portion of the sealing diaphragm is received.

17. The check valve adapter of claim 14, wherein the at least one sealing diaphragm comprises a plurality of sealing diaphragms each having a sealing face abutting a valve seat, and wherein adapter body comprises:
a base;
a first circumferential wall extending from the base in a first direction, the first circumferential wall adapted to attach to a flange associated with the opening of the electrical charging inlet; and
a second circumferential wall extending from the base in a second direction, opposite the first direction.

18. The check valve adapter of claim 17, wherein the adapter body further comprises a bottom wall formed on an end of the second circumferential wall, the bottom wall having a tapering profile for directing fluid toward the plurality of sealing diaphragms.

19. The check valve adapter of claim 18, wherein the bottom wall comprises:
a pair of outer bottom wall segment, each tapering in a direction toward one of the valve seats; and
a pair of inner bottom wall segments arranged between the pair of valve seats and each tapering outward toward a respective one of the valve seats.

20. The check valve adapter of claim 17, wherein the second circumferential wall defines a pair of semi-cylindrical interior openings aligned axially with the valve seats, and wherein each diaphragm comprises disc-shaped diaphragm having a center portion for attaching to the adapter body and a radial portion selectively sealable to a surface of the valve seat and moveable between a sealing position and an open position under a force exerted by the presence of fluid in the interior space of the adapter body.

* * * * *